(12) United States Patent
Kikuchi et al.

(10) Patent No.: US 6,213,585 B1
(45) Date of Patent: Apr. 10, 2001

(54) IMAGE FORMATION APPARATUS

(75) Inventors: Noriyuki Kikuchi, Mishima; Hiroki Umezawa, Shizuoka-ken, both of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,421

(22) Filed: Jan. 26, 1999

(30) Foreign Application Priority Data

Jan. 28, 1998 (JP) .................................................. 10-015385

(51) Int. Cl.⁷ ...................................................... B41J 2/145
(52) U.S. Cl. .............................................................. 347/41
(58) Field of Search ...................... 347/41, 40; 358/528, 358/455, 298

(56) References Cited

U.S. PATENT DOCUMENTS

| 4,864,328 | 9/1989 | Fischbeck | 347/43 |
| 5,300,957 | 4/1994 | Burke | 347/41 |
| 5,475,497 | * 12/1995 | Neuhoff et al. | 358/298 |
| 5,889,537 | * 3/1999 | Shimada | 347/41 |

FOREIGN PATENT DOCUMENTS

| 0 076 948 A2 | 4/1983 | (EP) . |
| 0 471 488 A2 | 2/1992 | (EP) . |
| 0 546 853 A1 | 6/1993 | (EP) . |
| 0 665 114 A2 | 8/1995 | (EP) . |
| 0 723 872 A2 | 7/1996 | (EP) . |
| 4-201365 | 7/1992 | (JP) . |

* cited by examiner

*Primary Examiner*—N. Le
(74) *Attorney, Agent, or Firm*—Frishauf, Holtz, Goodman, Langer & Chick, P.C.

(57) ABSTRACT

Provided is an image formation apparatus for printing pixel dots on a recording paper at pitches smaller than intervals between ink jet-out ports by using an ink jet recording head while moving the recording head in a rotation shaft direction and feeding a recording paper around the drum so as to wind the drum. The ink jet recording head has a plurality of ink jet-out ports arranged in line and is movable in a rotation shaft direction of the drum. In the case where the image formation is completed by two rounds of the drum, the recording head is shifted at the time the first drum rotation is completed, by a moving step amount determined so as to correspond to a specific feature of a human visual system, thereby suppressing image formation that is non-uniform in concentration.

4 Claims, 10 Drawing Sheets

IMAGE FORMATION APPARATUS

BACKGROUND OF THE INVENTION

The present invention relates to an image formation apparatus for forming an image by printing dots while feeding a recording medium relatively in a direction virtually perpendicular to a linear arrangement direction of recording elements of a recording head.

As an example of the image formation apparatus of this type, conventionally known is an ink-jet type line printer. Such an ink-jet type line printer has a line recording head consisting of a plurality of ink chambers arranged in a main scanning direction (i.e., a line direction) and ink jet-out ports corresponding to the ink chambers. To improve image quality, it is necessary to form the ink jet-out ports in the same size and shape and arrange them at the same intervals (pitches). However, in practice, it is difficult to form all the ink jet-out ports such that they are identical. If the ink jet-out ports formed in a head manufacturing step slightly differ in size and shape, the difference in size and shape has an effect on amounts and directions of ink jetting out from the ink jet-out ports. The resultant image is non-uniform in concentration and thus degraded in quality.

Figure 9:
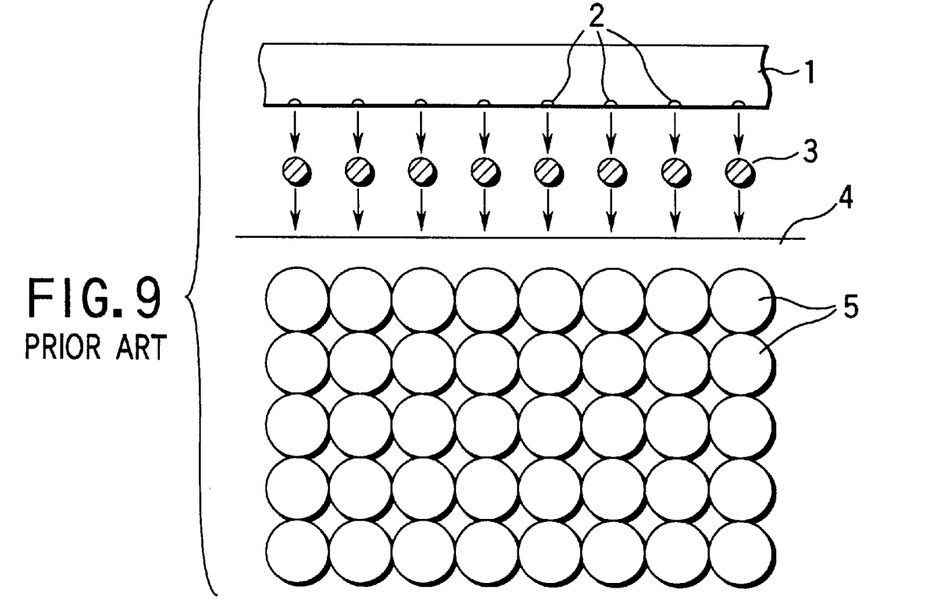
FIG. 9 of a view showing an ideal image formed by the ink-jet printer.

As shown, for example, in FIG. 9, in the case where ink is jetted out from individual ink jet-out ports 2 of the line recording head 1 in the same amount and in the same direction, ink dots 3 jetted out from the ink jet-out ports 2 will be identical. Consequently, pixel dots 5 will be printed in identical size and direction on a recording paper (recording medium) 4. As a whole, the formed image is uniform in concentration.

Figure 10:
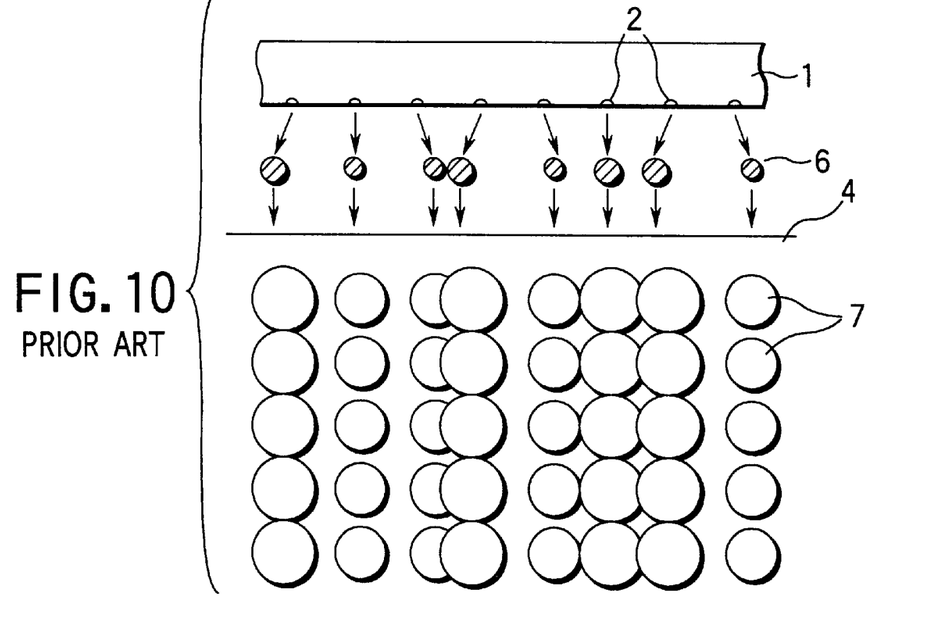
FIG. 10 is a view showing an image formed by the ink jet printer when the formed image is non-uniform in concentration.

In practice, however, the ink jet-out ports 2 of the line recording head 1 are formed irregularly in size and shape, as shown in FIG. 10. The ink dots 6 jetted out from the ink-jet ports 2 therefore differ in jet out amount and direction. As a result, pixel dots 7 printed on the recording paper 4 differ in size and direction. If such dots are overlapped excessively, a black stripe is formed, whereas if the dots are printed at much larger intervals than required, a white stripe is formed. The resultant image is non-uniform in concentration.

Figure 11:
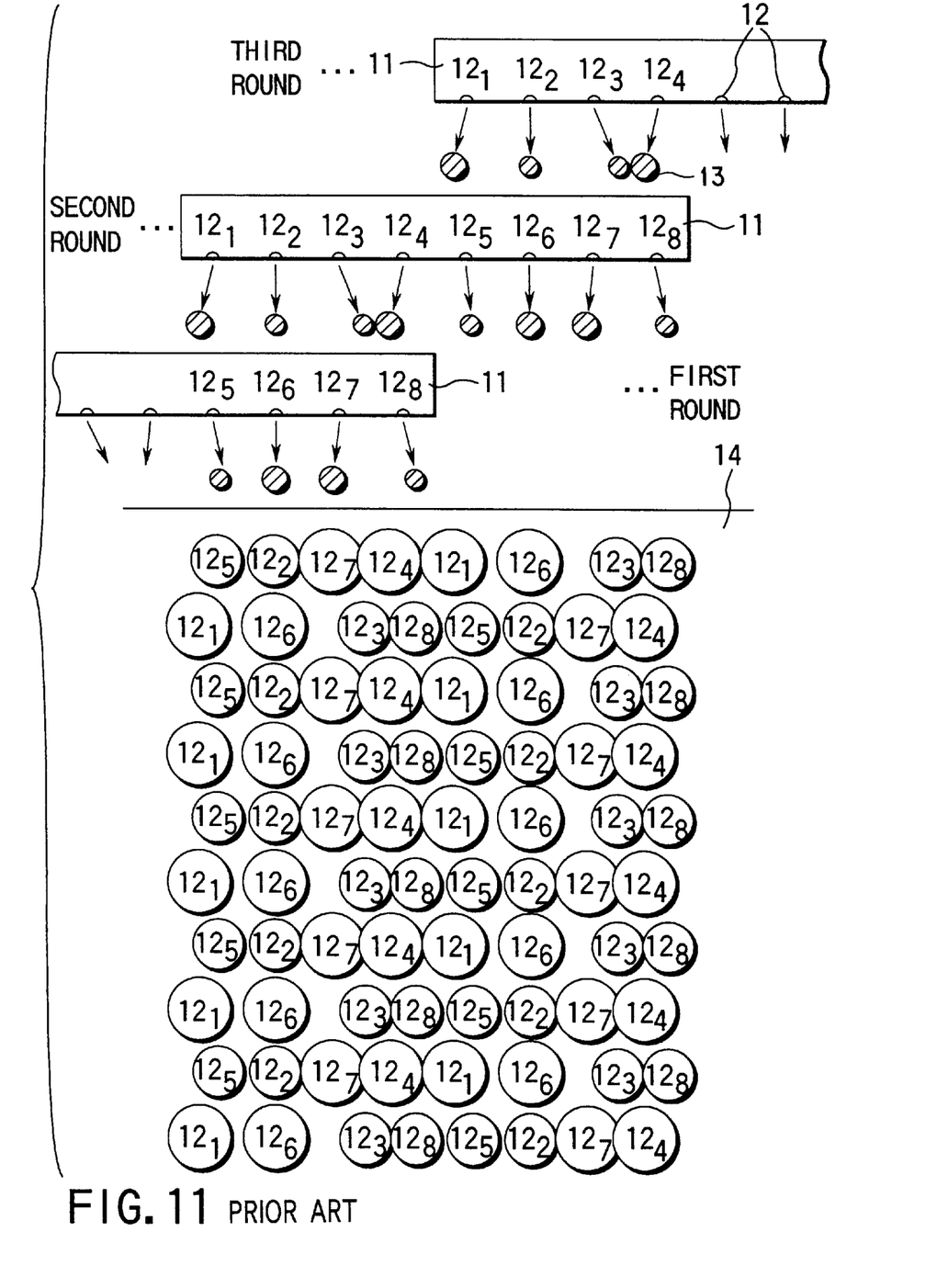
FIG. 11 is a view for explaining how to control a conventional ink-jet printer in order to suppress image formation that is non-uniform in concentration.

To suppress image formation from being non-uniform in concentration as much as possible, known is a control method shown in FIG. 11. In this method, assuming that a line recording head 11 consists of, for example, eight ink-jet ports 12, the line recording head 11 is controlled by moving the line recording head 11 in an arrangement direction of the ink jet-out ports 12 (recording elements) while a recording paper 14 is fed repeatedly in a direction virtually perpendicular to the arrangement direction of the ink jet-out ports 12, multiple times. In this case, since ink dots 13 jetted out from ink jet-out ports 12 differ in jet-out amount and direction, an image is formed on the recording paper 14 (wound around a drum three times) by printing dots alternately up and down in a staggering manner while controlling movement of the line recording head 11 at every round.

In other words, at a first round of the drum, first to fourth ink jet-out ports $12_5$ to $12_8$ from the right hand side of the line recording head 11 are used. More specifically, the ink jet-out ports $12_5$ and $12_7$ are used to print dots of odd lines, whereas the ink jet-out ports $12_6$ and $12_8$ are used to print dots of even lines. At a second round of the drum, the line recording head 11 is slid rightward by four pitches of the ink jet-out ports. At this time, all ink jet-out ports $12_1$ to $12_8$ of the line recording head 11 are used. More specifically, dots of odd lines are printed by the ink jet-out ports $12_2$, $12_4$, $12_6$, $12_8$, whereas dots of even lines are printed by the ink jet-out ports $12_1$, $12_3$, $12_5$, $12_7$. At a final round (third round), the line recording head 11 is slid further rightward by four pitches of ink jet-out ports. In this case, first to fourth ink jet-out ports $12_1$–$12_4$ from the lefthand side are used. That is, the ink jet-out ports $12_1$ and $12_3$ are used for printing dots of odd lines, whereas the ink jet out-ports $12_2$ and $12_4$ are used to print dots of even lines.

In the recording method of this type, if the ink jet-out ports $12_1$–$12_8$ are irregularly formed in size and shape, the effect of the irregularity in size and shape on the image formed on the recording paper 14 is reduced in half. As a result, the black and white stripes as shown in FIG. 10 are not clearly visible, so that image formation that is non-uniform in concentration can be suppressed.

Figure 12:
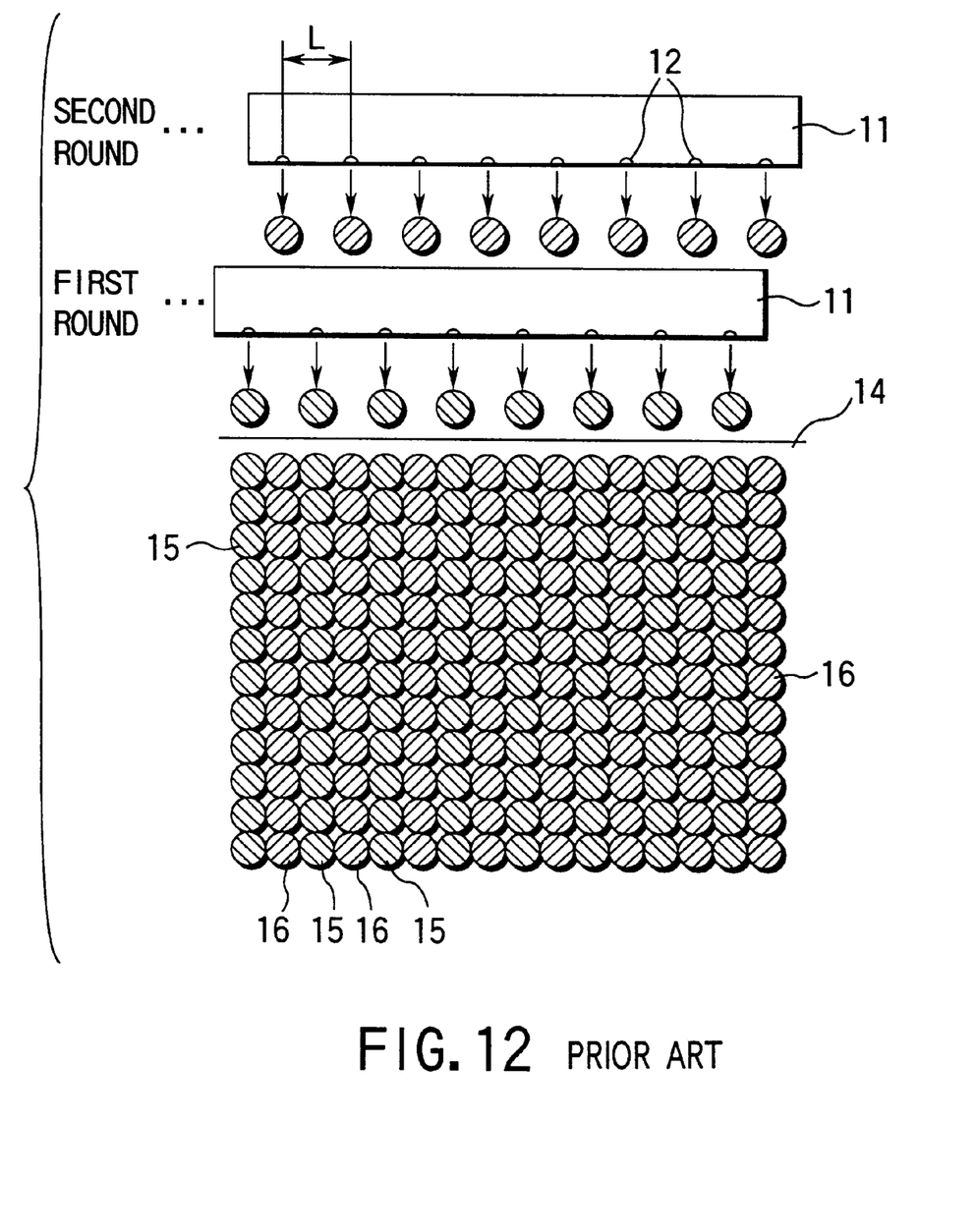
FIG. 12 is a view for explaining how to control a conventional ink jet printer in order to enhance resolution of an image.

Furthermore, another control method is known which is concerned with increasing resolution. In the control method, the line recording head 11 is slid in the arrangement direction of the ink jet-out ports 12 by L/K (L is an arrangement interval of the ink jet-out ports 12), while the recording paper 14 is repeatedly fed in the direction virtually perpendicular to the arrangement direction of the ink jet-out ports 12, multiple times. In the case where the recording paper 14 is wound around the drum twice, pixel dots 15 (indicated by hatched lines declining rightward in the figure) are printed on the recording paper 14 at a first round of the drum, as shown in FIG. 12. At the second round, the line recording head 11 is slid rightward by L/2 (L is an arrangement interval of the ink jet-out ports 12), and then, recording pixel dots 16 (indicated by hatched lines declining leftward in the figure) are printed on the recording paper 14. In this manner, the resolution of the formed image is improved twice as high as that of the line recording head 11.

Figure 13:
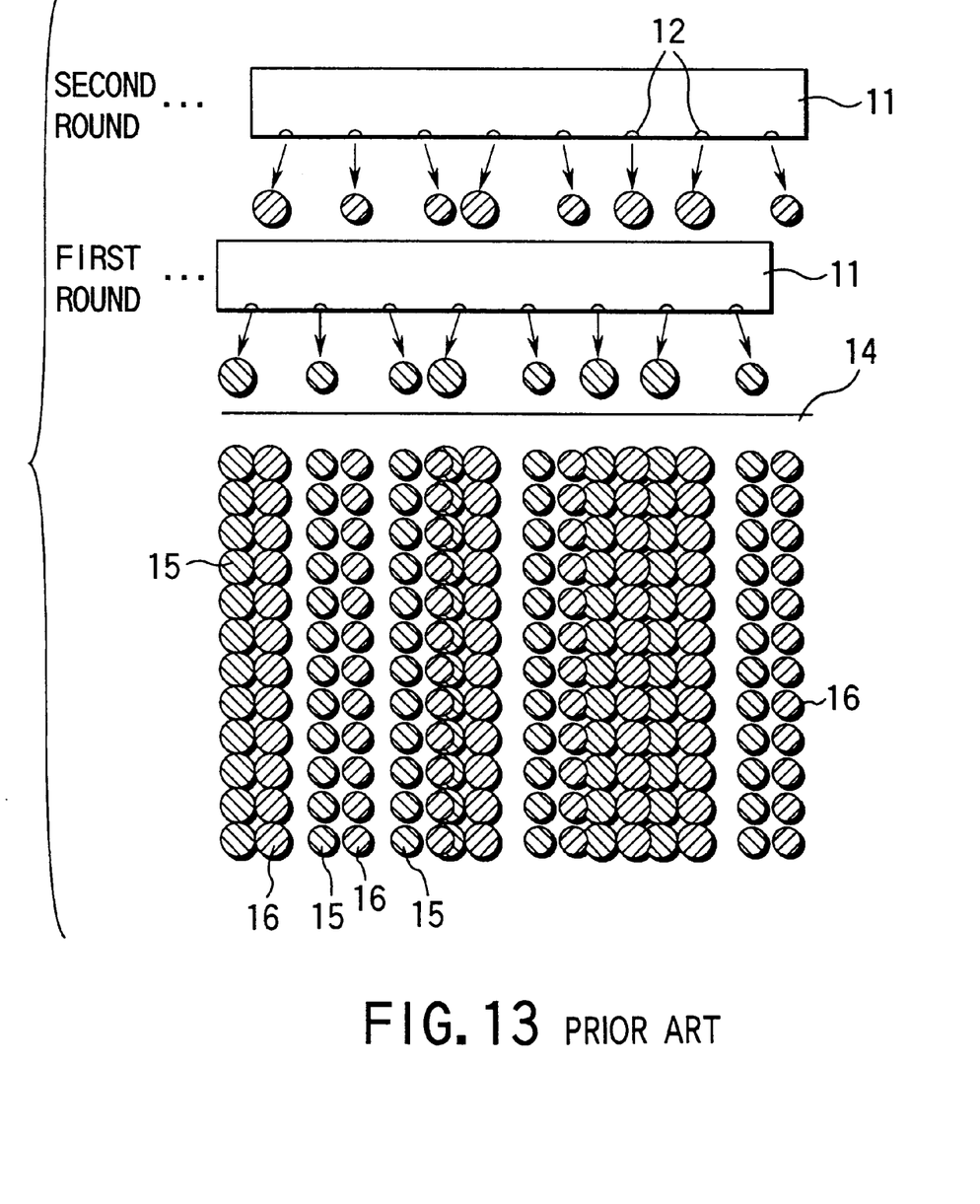
FIG. 13 is a view for explaining problems in the case where a conventional ink jet printer is controlled for improving the resolution of an image.

As described, in the image formation method for improving the resolution of the image by controlling the movement of the line recording head 11, if the ink dots jetted out from the ink jet-out ports 12 of the line recording head 11 differ in jet-out amount and direction, the black stripe (which is formed by excessively overlapping dots than required) and the white stripe (which is formed by printing dots at intervals which are excessively far from each other than required) emerge, as shown in FIG. 13. As a result, the obtained image is non-uniform in concentration as a whole.

Figure 14:
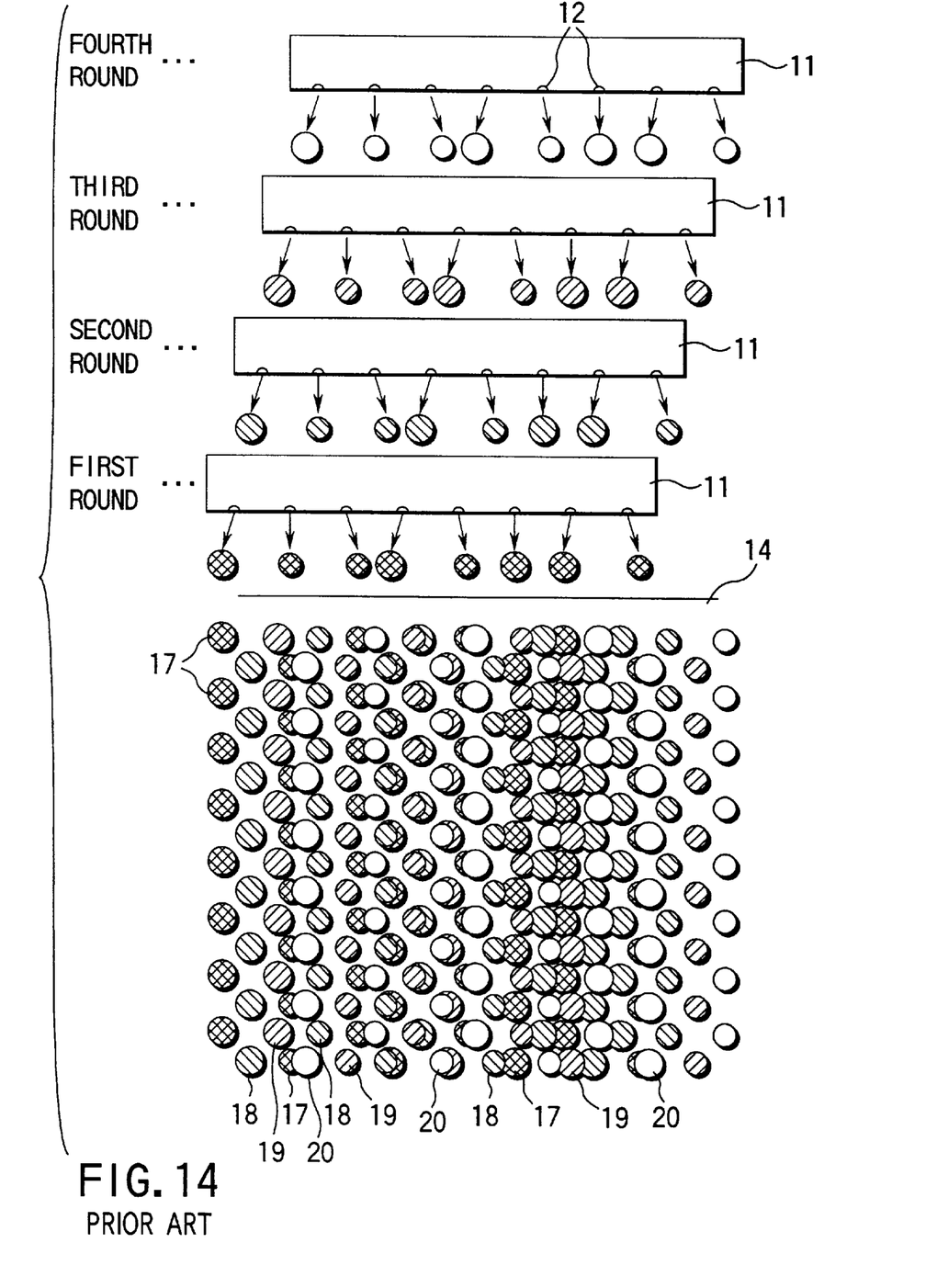
FIG. 14 is a view for explaining problems in the case where a conventional ink jet printer is controlled for suppressing image formation that is non-uniform in concentration and for improving resolution.

To overcome this problem, it is considered that the image is formed by two control methods in combination, as shown in FIG. 14. One is a control method in which the line recording head 11 is slid by L/2 (L is an arrangement interval of the ink jet-out ports 12) and the other is a control method in which dots are printed on the recording paper 14 alternately up and down in a staggering manner. To be more specific, at a first round of the drum, pixel dots 17 (indicated by a lattice pattern in the figure) are printed on the recording paper 14. At a second round of the drum, the line recording head 11 is slid rightward by L/2, and then, pixel dots 18 (indicated by hatched line declining rightward) are printed on the recording paper 14. At a third round of the drum, the line recording head 11 is slid further rightward by L/2, and then, pixel dots 19 (indicated by hatched lines declining leftward) are printed. At a fourth round of the drum, the line recording head 11 is further slid rightward by L/2 and then pixel dots 20 (indicated by a white circle in the figure) are printed on the recording paper 14. In this manner, the resolution of the image is improved twice as high as that of the line recording head 11. At the same time, image formation that is non-uniform in concentration due to irregular arrangement of the ink jet-out ports can be successively suppressed.

However, the aforementioned control technique has a problem in that it takes too much time to form the image since the time required for image formation is doubled as compared to the control method which only increases the resolution.

BRIEF SUMMARY OF THE INVENTION

An object of the present invention is to provide an image formation apparatus capable of improving image quality by suppressing image formation that is non-uniform in concentration due to irregularity in size and shape of ink jet-out ports, and capable of reducing the time required for image formation.

According to one aspect of the present invention, the image formation apparatus has a recording head having a plurality of recording elements arranged in line. Using the recording head, an image is formed by printing dots on a recording medium while the recording medium is fed relatively in a direction virtually perpendicular to an arrangement direction of the recording elements of the recording head. The present invention is characterized in that dots are printed at pitches smaller than arrangement intervals of the recording elements by feeding the recording medium to the recording head repeatedly multiple times while the recording head is being moved in the arrangement direction of recording elements, and in that the recording head is slid by a moving amount determined so as to correspond to a specific feature of a human visual system every time the feed of the recording medium is repeated to the recording head.

According to the aspect of the present invention, quality of the image can be improved by successively suppressing image formation that is non-uniform in concentration due to the irregularity of ink jet-out ports in size and shape. Furthermore, the time required for image formation can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, an embodiment of the present invention will be explained with reference to FIGS. 1 to 7. In this embodiment, the present invention is applied to an ink-jet type line printer.

Figure 1:
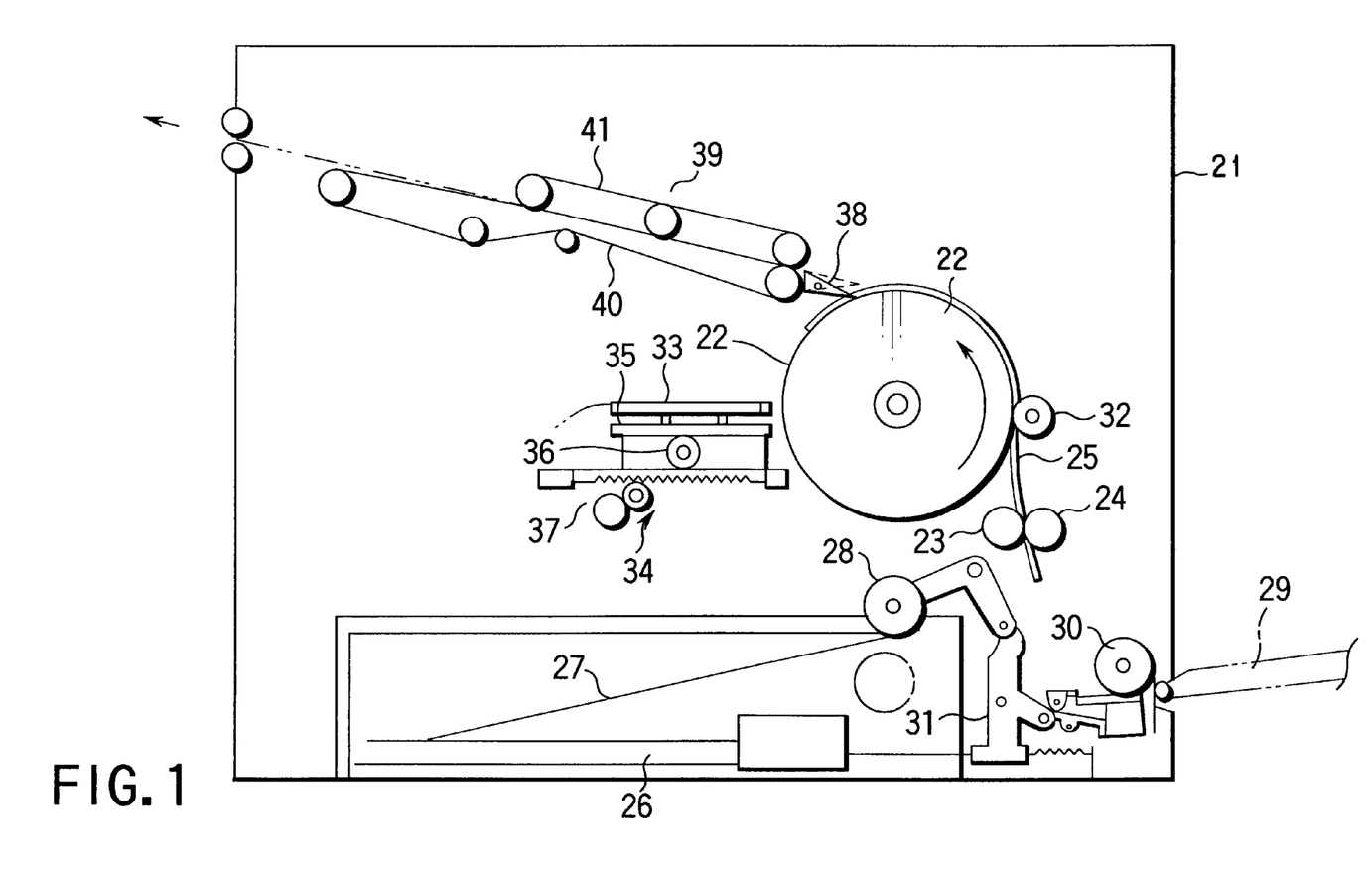
FIG. 1 shows a main portion of an entire structure of a printer according to an embodiment of the present invention.

FIG. 1 is a view showing a main portion of an entire structure of a printer. The printer has a main case 21 housing a drum 22. The drum is rotated at a constant speed in the direction indicated by an arrow in the figure. A recording paper 25 (recording medium) to be fed through paper feed rollers 23, 24 is wound around the drum 22.

A paper feed cassette 26 is fitted to the bottom portion of the main case 21. Recording paper sheets 25 mounted on the mounting plate 27 of the paper feed cassette 26 is taken out one by one and sent to the paper feed rollers 23, 24. On the other hand, the recording paper sheets 25 can be manually fed through a manual feeding tray 29 which is fitted to an openable side portion of the main case 21. The manually fed recording paper sheet is also sent to the paper feed rollers 23, 24 by a paper feed roller 30. Note that a paper-feed switching means 31 is responsible for switching the paper feed routes to be controlled by the paper feed roller 28 and by the paper feed roller 30.

A charging roller 32 is arranged so as to face the drum 22. The charged roller 32 is responsible for adsorbing the recording paper sheet 25 fed through the paper feed rollers 23, 24, on the drum surface. Furthermore, a printing mechanism 34 is arranged so as to face the drum 22. The printing mechanism 34 has an ink-jet recording head 33 having a plurality of recording elements arranged in lines. The printing mechanism 34 is movable in a recording element arrangement direction (i.e., along a rotation shaft of the drum 22). Therefore, the recording paper 25 is fed in a direction perpendicular to the recording element arrangement direction of the ink-jet recording head 33 by rotation of the drum 22.

Figure 2:
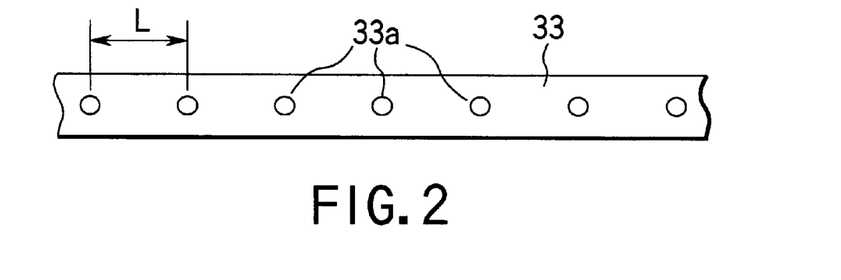
FIG. 2 is a view showing arrangement of the ink jet-out ports of the ink jet recording head according the embodiment.

The ink-jet recording head 33 has a plurality of ink jet ports 33a (serving as recording elements) arranged at intervals (pitches) L. Ink chambers are formed corresponding to ink jet-out ports 13a.

The printing mechanism 34 comprises a reciprocal moving mechanism 35 having the ink jet recording head 33 mounted thereon, a motor unit 36 having a reciprocal moving rod and a linear motor, and a back-and-forth moving means 37. The ink jet recording head 33 is moved back and forth by the back-and-forth moving means 37 with respect to the drum 22; at the same time, the ink jet recording head 33 is moved reciprocally in the rotation shaft direction of the drum 22. The reciprocal movement of the ink-jet recording head 33 is controlled by the motor unit 36, which moves the reciprocal moving mechanism 35 in the rotation-shaft direction of the drum 22.

The drum 22 has a recording paper detachment means having a detachment nail 38, which is capable of being inserted between the drum surface and the recording paper sheet 25. The detachment nail 38 removes the recording paper sheet 25 and discharges it into a recording paper sheet discharge means 39. The recording paper discharge means 39 comprises a belt conveyer 40 which is in contact with a non-recording surface of the recording paper 25 and a pressing means 41 for pressing the recording paper sheet 25 against the belt conveyer 40.

The recording paper sheet 25 is conveyed by the belt conveyer 40 to a terminal end of the belt conveyer 40 and then discharged outward through a side face of the main case 21.

The resolution of the image formed by the apparatus is set at K-fold (K is an integer of 2 or more) of the resolution of the interval (pitch) L of ink jet-out ports 33a of the ink jet recording head 33. The ink jet recording head 33 moves by T×L/K (T is a positive integer representing a head moving step amount) in the rotation-shaft direction of the drum 22 when the drum 22 rotates once. The head moving step amount T is determined in consideration of a specific feature of human visualization. To be more specific, a human eye is characterized by a band pass filter which passes only light having frequencies within a certain band zone. Since the eye acts as the band filter as mentioned, the image captured by the human eye slightly differs from the image detected by retina and transmitted to the brain.

Figure 3:
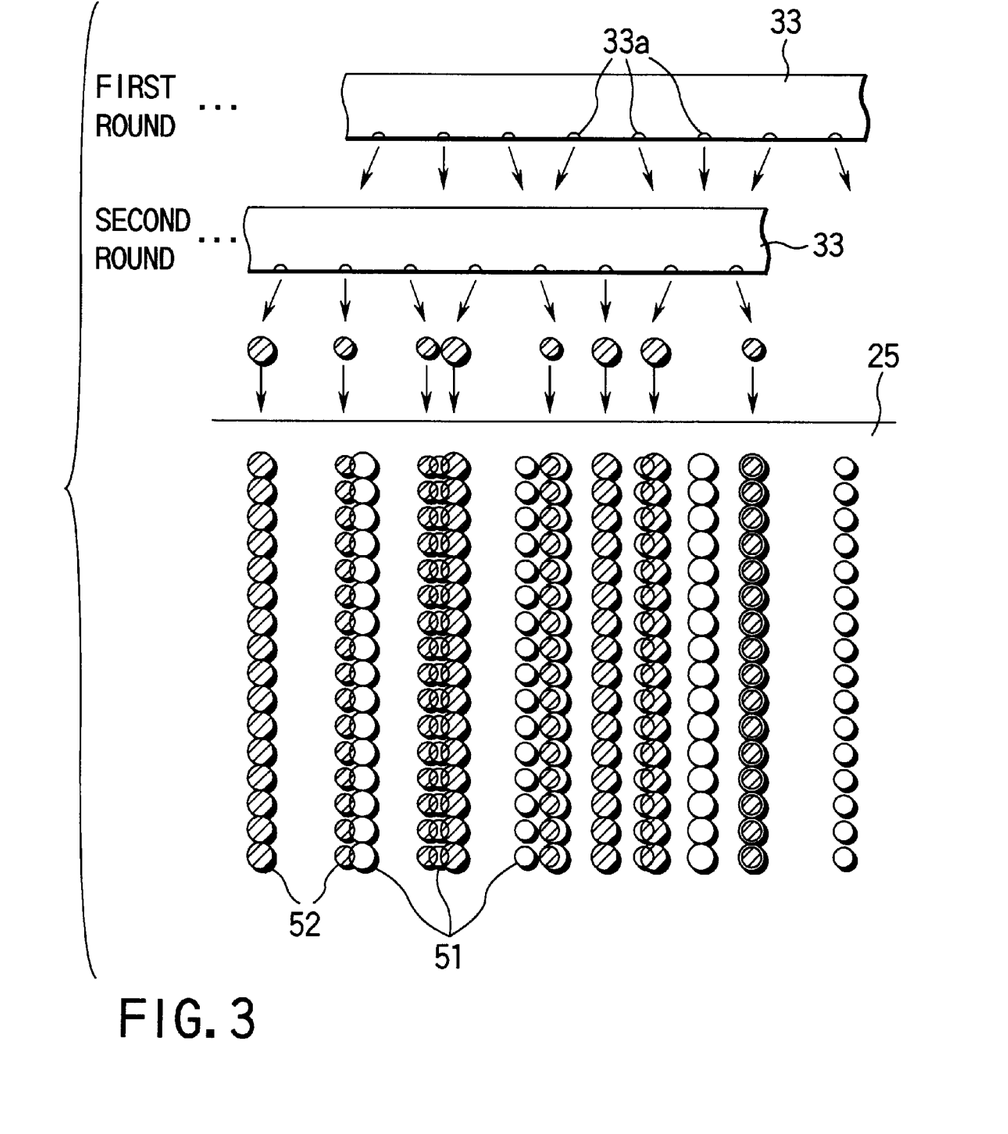
FIG. 3 is a view showing the relationship between a moving step amount of the ink-jet recording head and pixel dots printed on the recording paper according to the embodiment.

For example, the image formed in FIG. 3 has a resolution twice as high as that of the interval (pitch) L of the ink jet-out ports 33a of the ink jet recording head 33. In this case, the ink jet recording head 33 moves by 3×L/2 in the rotation-shaft direction of the drum 22 when the drum 22 rotates once. In other words, the head moving step amount T is set at 3.

In this case, at the first rotation of the drum 22, pixel dots 51 (indicated by an open circle) are printed by jetting out ink from ink jet-out ports 33a of the ink jet recording head 33. At a second rotation of the drum 22, pixel dots 52 (indicated by hatched lines declining leftward) are printed by jetting out ink from ink jet-out ports 33a of the ink jet recording head 33.

If the image formation is formed by printing pixel dots as mentioned above, it is possible to form an image improved in resolution and in quality which is rated as the most suitable as viewed from human eyes. More specifically, the drum 22 is required to rotate only for improving the resolution but not for suppressing the black and white stripes. It is therefore possible to enhance the resolution and to suppress image formation that is non-uniform in concentration due to irregularity of the ink jet-out ports 33a in size and shape by rotating the drum few number of times, with the result that the image quality is improved and the time required for image formation can be reduced.

Now, we will describe how to determine the head moving step amount T.

In general, a figure showing concentration distribution of pixel dots printed by the ink-jet printer can be approximated by means of "Gauss distribution", which is often used in analysis of natural phenomena. In the case where the coordinate in the arrangement direction of ink jet-out ports 33a of the ink jet recording head 33 is represented by $\underline{x}$, and the coordinate in the feed direction of the recording paper sheet 25 is represented by $\underline{y}$, the concentration distribution function of image data can be given by the following equation (1):

$$d(x - x_0, y - y_0) = D_{max} \exp\left\{-2\left[\left(\frac{x - x_0}{a}\right)^2 + \left(\frac{y - y_0}{b}\right)^2\right]\right\} \quad (1)$$

Where Dmax is the maximum concentration value, x0 and y0 are off-set positions of a pixel dot; a, b are radii at 1/e2 of a spot in the x direction and the y direction, respectively. In this case, if $\underline{x}$ and $\underline{y}$ are present within the range of one pixel, the concentration distribution function represented by the aforementioned equation (1) is regarded as a minimum unit for forming an image. Hence, the entire image is formed by synthesizing the concentration distributions of the minimum unit. That is, the minimum unit may be regarded as a basic distribution function for image formation.

Figure 4:
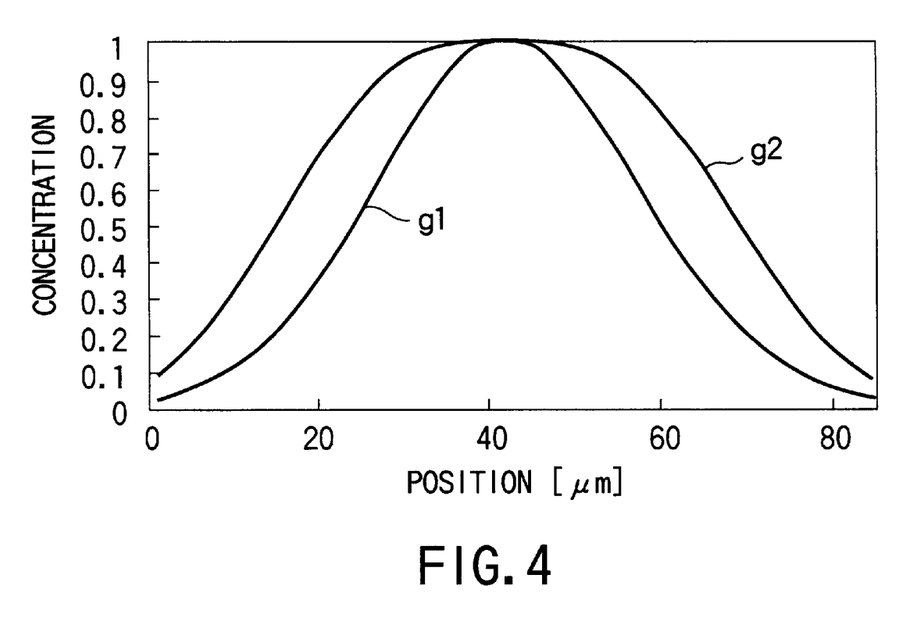
FIG. 4 is a one-dimensional concentration distribution curve showing a Gaussian distribution function curve and a basic concentration function curve of the ink jet printer.

For example, in the case where an area-modification ink-jet printer is employed as the ink-jet printer, the basic concentration function depends on Dmax, $\underline{a}$ and $\underline{b}$ ($\underline{a}$ and $\underline{b}$ are variable depending upon respective tones). However, since the dot concentration figure actually formed by the ink jet printer slightly differs from that of the Gauss distribution mentioned above, the Equation (2) modified from the Equation (1) may be used. FIG. 4 shows a curve g1 indicating the Gauss distribution function in comparison with a curve g2 indicating the basic concentration distribution function for use in simulation in practice. The curve indicates a one-dimensional function in the x direction.

$$d_1(x - x_0, y - y_0) = D_{max} \exp\left\{-\left[\left(\frac{x - x_0}{0.9a}\right)^2 + \left(\frac{y - y_0}{0.9b}\right)^2\right]^{1.5}\right\} \quad (2)$$

The concentration distribution of the synthesized image is determined by synthesizing the basic distribution functions and thus represented by the following equation (3):

$$e(x, y) = \sum_{x=0}^{M} \sum_{y=0}^{N} \sum_{i=0}^{m} \sum_{j=0}^{n} d_1(x - x_i, y - y_1) \quad (3)$$

where $\underline{m}$ is the number of pixels in the arrangement direction of the ink-jet ports 33a; $\underline{n}$ is the number of pixels in the feed direction of the recording paper sheet 25, and M and N are the sampling numbers (corresponding to dividing numbers of each pixel) in the x direction and y direction, respectively.

However, the printing positions of the pixel dots are shifted from right positions in most cases by the irregularity of the ink-jet ports 33a in size and shape which are formed by causes in the head manufacturing step. Therefore, in consideration of error equations $g(x_j)$ and $h(y_j)$ of the pixel dot recording portion in the x direction and Y direction, respectively, the pixel dot recording position is represented by the following equation (4):

$$e_1(x, y) = \sum_{x=0}^{M} \sum_{y=0}^{N} \sum_{i=0}^{m} \sum_{j=0}^{n} d_1(x - (x_i + g(x_i)), y - (y_j + h(y_j)))  \quad (4)$$

In the case of analyzing image signals in a frequency space, a two-dimensional frequency analysis is generally employed. If the image signal is treated as a one-dimensional signal for brevity sake, the basic concentration distribution function of an image is represented by the following equation (5):

$$d_2(x - x_0) = D_{max} \exp\left\{-\left[\left(\frac{x - x_0}{0.9\ a}\right)^2\right]^{1.5}\right\} \quad (5)$$

Furthermore, taking an error of the pixel dot recording position into consideration, the concentration distribution of the synthesized image is represented by the following equation (6):

$$e_2(x) = \sum_{x=0}^{M} \sum_{i=0}^{m} d_2(x - (x_i + g(x_i))) \quad (6)$$

Since the human visual system can be regarded as a filter passing frequencies within a certain band zone, convolution of the spatial frequency characteristics of the image and of the human visual system must be carried out. The convolution made in the frequency space results in a product of two functions as shown in the following equation (7):

$$G(\mu) = E(\mu)H(\mu) \quad (7)$$

$\mu$: frequency $H(\mu)$: spatial frequency characteristics of visualization $E(\mu)$: spatial frequency characteristics of image (Fourier transform of $e_2(x)$)

A final evaluation amount is an integration value of $G(\mu)$ in an effective frequency region as given by $$\text{Evaluation amount} = \int_\mu G(\mu)d\mu \quad (8)$$

The larger the evaluation amount represented by the equation (8), the more sensitive a human eye to the white and black stripes formed by the irregularity of ink jet-out port 33a in size and shape. In other words, if the head movement step amount T indicating a low evaluation amount, is selected, the most preferable image as viewed from human eyes can be printed.

Now, we will explain the evaluation when an image is actually formed with a resolution of 300 dpi.

Figure 5:
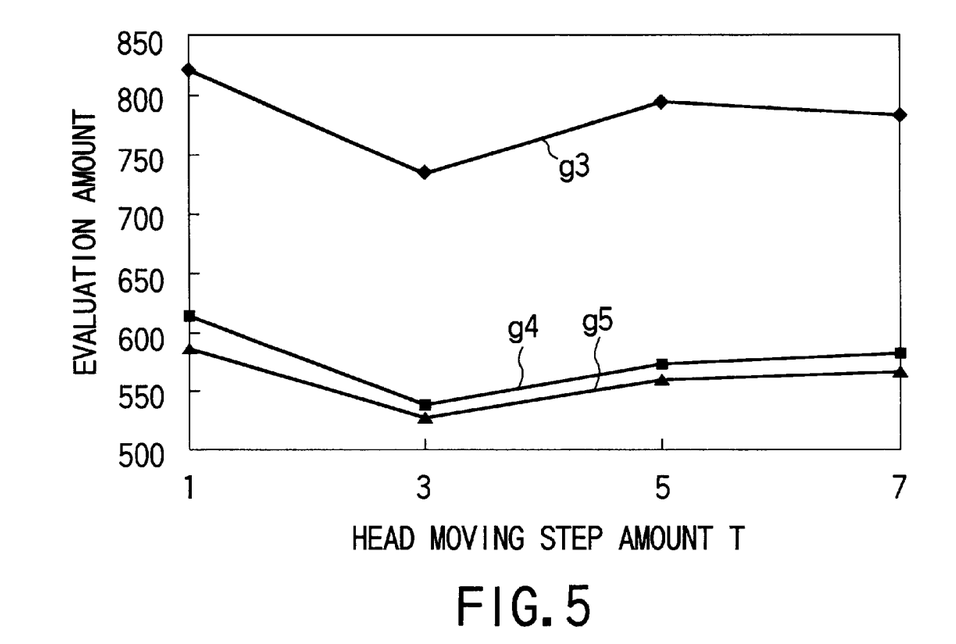
FIG. 5 is a graph showing the head moving step amount versus the objective evaluation when the resolution is 300 dpi in the embodiment.

FIG. 5 is a graph plotting evaluation amount by simulation at each of head moving step amounts T=1, 3, 5, and 7 when the image is formed with a resolution of 300 dpi by using a recording head having the ink jet-out ports 33a arranged at intervals of 150 dpi. Curves g3, g4, g5 of the graph in the figure respectively show evaluation amounts in the cases three types of ink jet-out head different in size and shape of jet out ports are used.

The evaluation amount is the lowest at the head moving step amount T=3 in any head of g3, g4, and g5. In other words, an image can be obtained in the most satisfactory quality at the head moving step amount T=3 when the image is formed with a resolution of 300 dpi.

To prove it, a subjective evaluation is further made. As the subjective evaluation, one-to-one comparison (alternative evaluation of yes and no) is made by a plurality of panels with respect to a pair of objects. Generally, all combinations: $_nC_2$:n(n−1)/2 , are checked by changing the order or positions.

Figure 6:
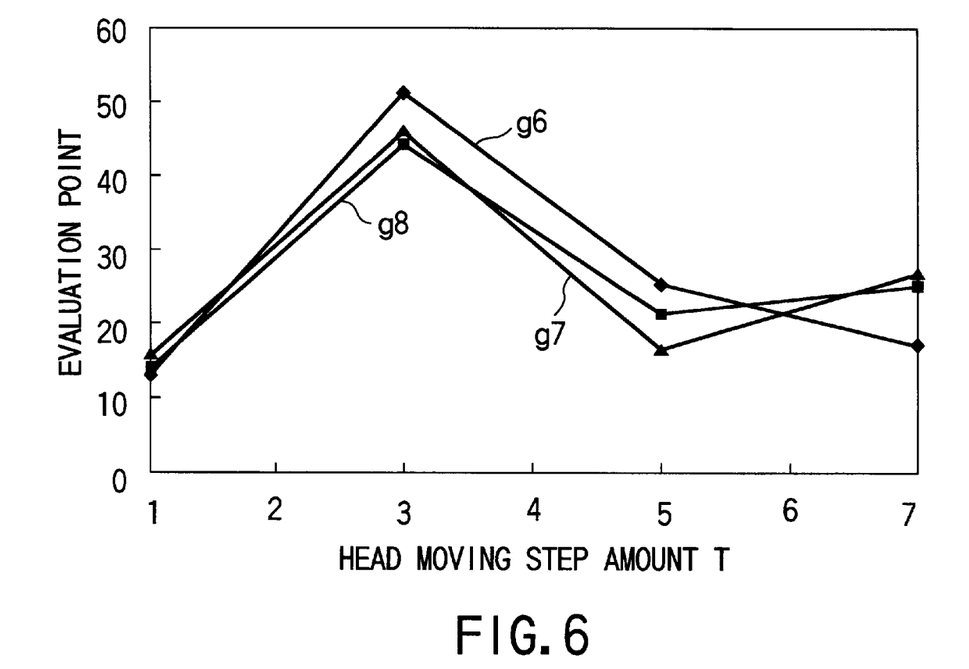
FIG. 6 is a graph showing the head moving step amount versus the subjective evaluation when the resolution is 300 dpi in the embodiment.

The results are shown in the graph of FIG. 6. The graphs g6, g7, g8 respectively show the evaluations when three types of ink jet-out heads having different sizes and shapes of the jet-out ports. Evaluation is made in such a scoring method that two points are given to the image superior in quality and a zero point is given to the image inferior in quality. Accordingly, the image earning a higher score means high in quality. Since the highest evaluation score is given at the head moving step amount T=3 in the subjective evaluation, the highest image quality is obtained at T=3.

As described above, the subjective evaluation results made by people agree with the objective evaluation results calculated by simulation. It is therefore successively proved that the head moving step amount T in accordance with the specific feature of human visualization can be effectively determined.

Figure 7:
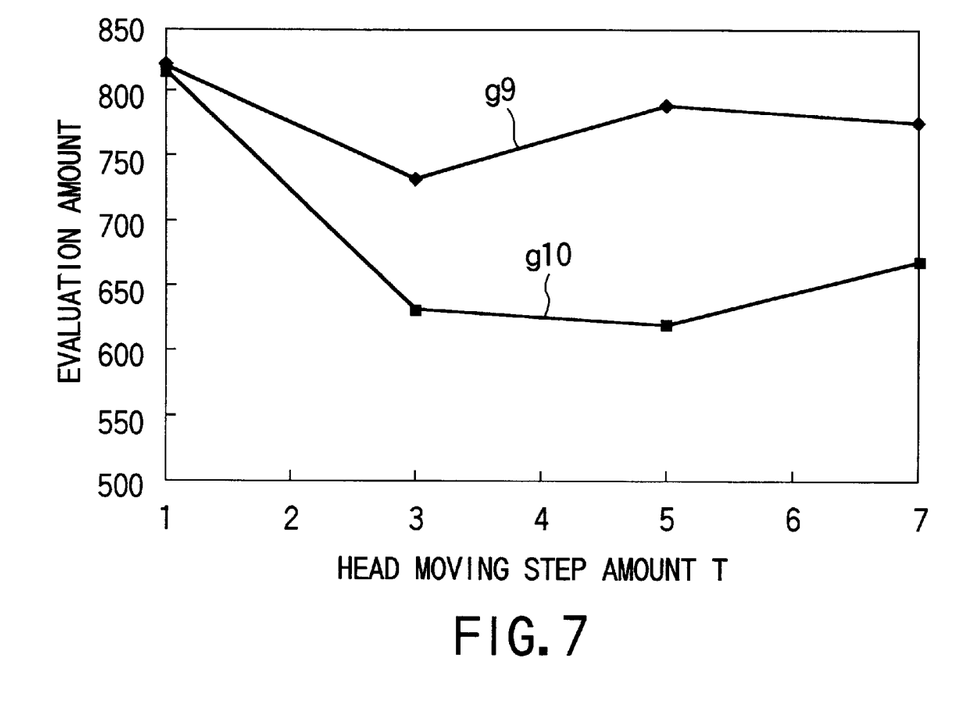
FIG. 7 is a graph showing the head moving step amount and the objective evaluation in the cases where the resolutions are 300 dpi and 600 dpi in the embodiment.

FIG. 7 shows the head moving step amount T versus the evaluation amount for two types of images with resolutions of 300 dpi and 600 dpi, respectively. More specifically, a graph g9 shows an image with a resolution of 300 dpi. A graph g10 shows an image with a resolution of 600 dpi. The lowest evaluation is given at the head moving step amount T of 3 in the case of 300 dpi resolution, and at the head moving step amount T of 5 in the case of 600 dpi.

As described, it is found that the most suitable head moving step amount T varies depending upon the resolution of the formed image. Therefore, if the head moving step amount T is controlled in accordance with the resolution of the printer to be used, the image can be formed in the most preferable quality in consideration of the specific feature of human visualization.

Figure 8:
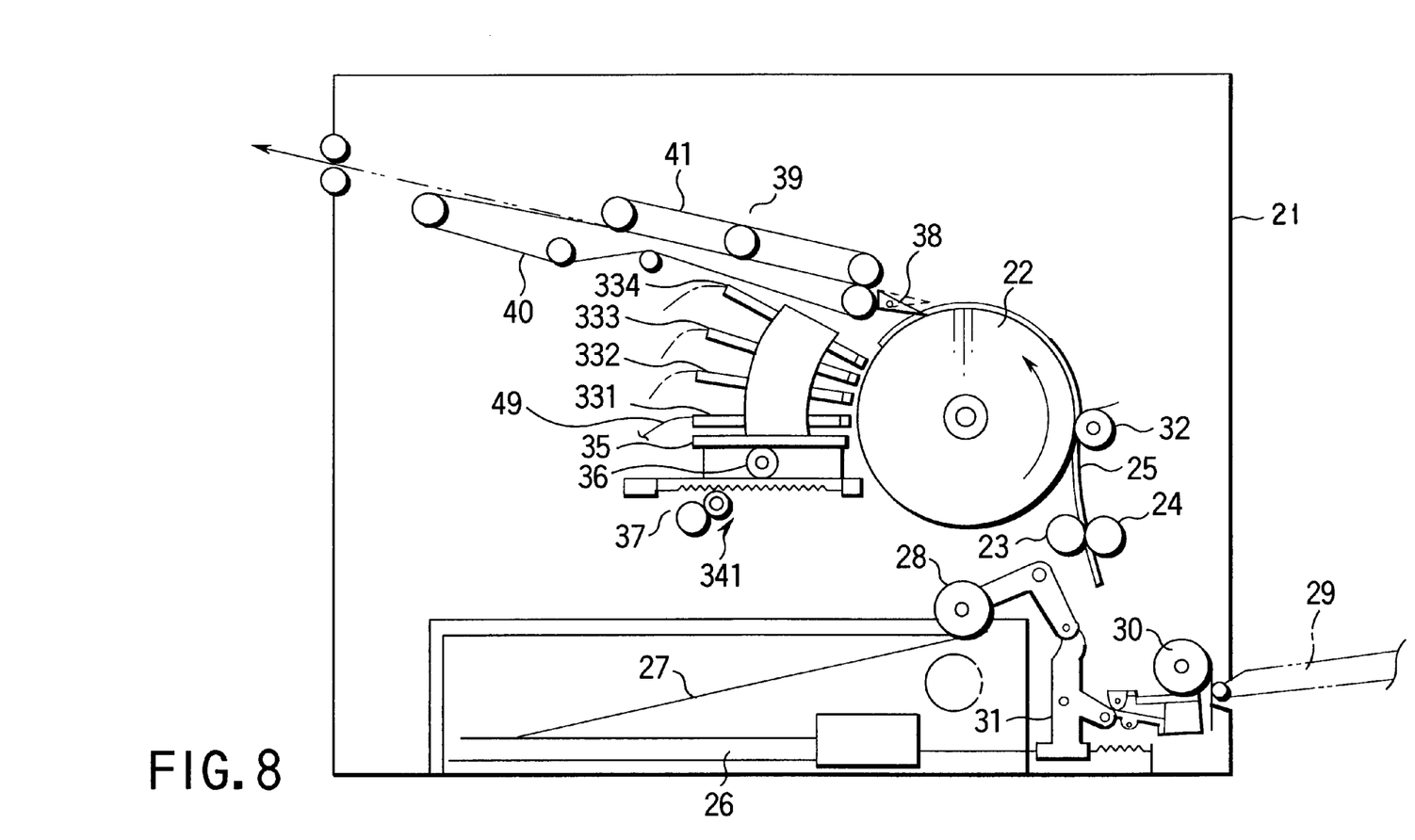
FIG. 8 is a view showing a gist portion of an entire structure of a printer according to another embodiment of the present invention.

In the foregoing, an example of the ink jet printer was described which has the printing mechanism 34 equipped with an ink jet recording head 33 having a plurality of recording elements arranged in line and being movable in the rotation shaft direction of the drum 22. However, the ink jet printer is not limited thereto. The present invention can be further applied to an ink jet color printer having a printing mechanism 341 equipped with four ink jet recording heads 331, 332, 333, 334 having a plurality of recording elements arranged in line and being movably in the rotation shaft direction of the drum 22, as shown in FIG. 8. In this case, the ink jet recording head 331 is set at "yellow", the ink jet recording head 332 is set at "Cyan", the ink jet recording head 333 is set at "magenta", and the ink jet recording head 334 is set at black, and then, these recording heads may be driven on the basis of the head moving step amount T which is determined in correspondence to the specific feature of a human visual system, in the same way as in the case of the ink-jet recording head 33. In this case, if the four ink jet recording heads 331–334 are mounted on the reciprocal moving mechanism 35, they can be controlled simultaneously.

In the aforementioned embodiments, we explained the case where the image is formed with resolutions of 300 dpi or 600 dpi by using the recording head having the ink jet out ports arranged at intervals of 150 dpi. The same explanation can be adopted to the cases where the image is formed with a resolution of 2A dpi or 4A dpi by the use of the recording head having ink jet out ports 33a arranged at intervals of A dpi.

Furthermore, an image having a resolution of 400 dpi can be formed by using a recording head having a plurality of recording elements arranged at intervals of 200 dpi if the recording head is moved by the predetermined number of head moving steps which is defined by the method according to the present invention.

Similarly, an image having a resolution of 800 dpi can be formed by using a recording head having a plurality of recording elements arranged at intervals of 200 dpi if the recording head is moved by the predetermined number of head moving steps which is defined by the method according to the present invention.

Similarly, an image having a resolution of 360 dpi can be formed by using a recording head having a plurality of recording elements arranged at intervals of 180 dpi if the recording head is moved by the predetermined number of heat moving steps which is defined by the method according to the present invention.

Still similarly, an image having a resolution of 720 dpi can be formed by using a recording head having a plurality of recording elements arranged at intervals of 180 dpi if the recording head is moved by the predetermined number of heat moving steps which is defined by the method according to the present invention.

In the aforementioned embodiments, we described the case in which the recording paper is fed in the direction virtually perpendicular to the arrangement direction of the ink jet-out ports of the ink jet recording head while the recording paper is wound around the drum. However, the present invention is not limited thereto. For example, the recording paper may be fed by being mounted on a belt conveyer etc. Alternatively, the recording head may be fed relative to the ink jet recording head by moving the ink jet recording head with respect to a recording paper immobilized.

In the embodiments mentioned above, we described the case in which the present invention is applied to the ink jet printer. However, the present invention is not limited thereto. The present invention may be applied to a printer having an LED recording head having a plurality of LED recording elements arranged in line, a printer having a thermal recording head having a plurality of thermal recording elements arranged in line, and a printer having an edge-emitter recording head having a plurality of EL recording elements arranged in line.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image formation apparatus, comprising:

a recording head having a plurality of recording elements arranged in line;

moving means for moving the recording head in an arrangement direction of the recording elements;

feed means for feeding a recording medium relatively in a direction virtually perpendicular to an arrangement direction of the recording elements of the recording head; and means for moving the recording head by a moving amount, $T \times L/K$ (T is a positive integer representing a head moving step amount, and L is a spacing between the recording elements) determined so as to correspond to a specific feature of a human visual system every time a recording medium is fed with respect to the recording head while allowing the moving means to move the recording head in the arrangement direction of the recording elements and allowing the feed means to feed the recording medium to the recording head repeatedly multiple times, thereby printing dots at pitches of $L/K$ (K is an integer of 2 or more) smaller than arrangement intervals of the recording elements, wherein said head moving step amount T is set at a minimum step amount which is given by an integration of products obtained by multiplying a spatial frequency characteristic of a formed image and a spatial frequency characteristic of visualization.

2. An image formation apparatus, comprising:

a recording head having a plurality of recording elements arranged in line;

moving means for moving the recording head in an arrangement direction of the recording elements;

feed means for feeding a recording medium relatively in a direction virtually perpendicular to an arrangement direction of the recording elements of the recording head; and means for moving the recording head by a moving amount, $T \times L/K$ (T is a positive integer representing a head moving step amount, and L is a spacing between the recording elements) determined so as to correspond to a specific feature of a human visual system every time a recording medium is fed with respect to the recording head while allowing the moving means to move the recording head in the arrangement direction of the recording elements and allowing the feed means to feed the recording medium to the recording head repeatedly multiple times, thereby printing dots at pitches of $L/K$ (K is an integer of 2 or more) smaller than arrangement intervals of the recording elements, wherein said head moving step amount T is set at a minimum step amount which is given by an integration of products obtained by multiplying a spatial frequency characteristic of visualization and a spatial frequency characteristic of a formed image which is obtained by Fourier-transforming a composite function of a concentration distribution function of a formed one dot and a function of each dot shifted from a regular forming position.

3. An image formation apparatus comprising:

a recording head having a plurality of recording elements arranged in line;

moving means for moving the recording head in an arrangement direction of the recording elements;

feed means for feeding a recording medium relatively in a direction virtually perpendicular to an arrangement direction of the recording elements of the recording head; and means for moving the recording head by a moving amount, $T \times L/K$ (T is a positive integer representing a head moving step amount, and L is a spacing between the recording elements) determined so as to correspond to a specific feature of a human visual system every time a recording medium is fed with respect to the recording head while allowing the moving means to move the recording head in the arrangement direction of the recording elements and allowing the feed means to feed the recording medium to the recording head repeatedly multiple times, thereby printing dots at pitches of L/K (K is an integer of 2 or more) smaller than arrangement intervals of the recording elements, wherein said head moving step amount T is set at a minimum step amount which is given by an integration of products obtained by multiplying a spatial frequency characteristic of visualization and a spatial frequency characteristic of a formed image which is obtained by Fourier-transforming a composite function of a concentration distribution function of a formed one dot and a function of each dot shifted from a regular forming position, said concentration distribution function is given by:

$$d_1(x - x_0, y - y_0) = D_{\max} \exp\left\{-\left[\left(\frac{x - x_0}{0.9\,a}\right)^2 + \left(\frac{y - y_0}{0.9\,b}\right)^2\right]^{1.5}\right\}$$

where Dmax is a maximum concentration value, x is the arrangement direction of the recording elements, y is a feed direction of the recording medium, x0 and y0 are offset positions of dots to be formed, and a and b are constants representing expansion of distribution in x and y directions.

4. An image formation apparatus comprising:
a recording head having a plurality of recording elements arranged in line;
moving means for moving the recording head in an arrangement direction of the recording elements;
feed means for feeding a recording medium relatively in a direction virtually perpendicular to an arrangement direction of the recording elements of the recording head; and
means for moving the recording head by a moving amount, T×L/K (T is a positive integer representing a head moving step amount, and L is a spacing between the recording elements) determined so as to correspond to a specific feature of a human visual system every time a recording medium is fed with respect to the recording head while allowing the moving means to move the recording head in the arrangement direction of the recording elements and allowing the feed means to feed the recording medium to the recording head repeatedly multiple times, thereby printing dots at Pitches of L/K (K is an integer of 2 or more) smaller than arrangement intervals of the recording elements, wherein said head moving step amount T is set at a minimum step amount which is given by an integration of products obtained by multiplying a spatial frequency characteristic of visualization and a spatial frequency characteristic of a formed image which is obtained by Fourier-transforming a composite function of a concentration distribution function of a formed one dot and a function of each dot shifted from a regular forming position, said the composite function being given by:

$$e_1(x, y) = \sum_{x=0}^{M} \sum_{y=0}^{N} \sum_{i=0}^{m} \sum_{j=0}^{n} d_1(x - (x_i + g(x_i)), y - (y_j + h(y_j)))$$

where m is the number of pixels in the arrangement direction of the recording elements, n is the number of pixels in a feed direction of the recording medium, M and N are sampling numbers in an x direction (corresponding to the arrangement of the recording elements) and a y direction (corresponding to the feed direction of the recording medium), and g(xi) and h(yj) are functions of dot positions shifted in the x and y directions.

* * * * *